United States Patent [19]
Caldwell et al.

[11] Patent Number: 6,003,109
[45] Date of Patent: Dec. 14, 1999

[54] METHOD AND APPARATUS FOR PROCESSING INTERRUPTS IN A DATA PROCESSING SYSTEM

[75] Inventors: Barry Elton Caldwell, Whitewater; Larry Leon Stephens, Burden, both of Kans.

[73] Assignee: LSI Logic Corporation, Milpitas, Calif.

[21] Appl. No.: 08/911,932

[22] Filed: Aug. 15, 1997

[51] Int. Cl.⁶ ................................................ G06F 13/14
[52] U.S. Cl. ........................... 710/262; 710/261; 710/49
[58] Field of Search ................... 395/733–742, 395/868–869

[56] References Cited

U.S. PATENT DOCUMENTS

| | | | |
|---|---|---|---|
| 3,866,181 | 2/1975 | Gayman et al. | 395/733 |
| 4,760,516 | 7/1988 | Zwick | 364/200 |
| 5,097,483 | 3/1992 | Bechtolsheim | 375/17 |
| 5,163,152 | 11/1992 | Okamato | 395/725 |
| 5,179,707 | 1/1993 | Piepho | 395/725 |
| 5,187,781 | 2/1993 | Heath | 395/325 |
| 5,265,255 | 11/1993 | Bonevento et al. | 364/DIG. 1 |
| 5,410,708 | 4/1995 | Miyamori | 395/725 |
| 5,414,858 | 5/1995 | Hoffman et al. | 395/725 |
| 5,506,997 | 4/1996 | Maguire et al. | 395/800 |
| 5,535,420 | 7/1996 | Kardach et al. | 395/868 |
| 5,555,430 | 9/1996 | Gephardt et al. | 395/800 |
| 5,581,771 | 12/1996 | Osakabe | 395/738 |
| 5,708,815 | 1/1998 | Poisner | 395/736 |
| 5,784,271 | 7/1998 | Nagasaki | 364/133 |
| 5,819,096 | 10/1998 | Nelson et al. | 395/733 |

FOREIGN PATENT DOCUMENTS

| | | | |
|---|---|---|---|
| 0454096 | 10/1991 | European Pat. Off. | G06F 13/24 |
| 0737923 | 10/1996 | European Pat. Off. | G06F 13/24 |
| 0775959 | 5/1997 | European Pat. Off. | G06F 13/24 |

OTHER PUBLICATIONS

Interrupt Sharing for Personal Computer; IBM Technical Disclosure Bulletin; vol. 29, No. 6, Nov., 1986; pp. 2380–2381, New York, US.

*Primary Examiner*—Ayaz R. Sheikh
*Assistant Examiner*—Raymond N Phan
*Attorney, Agent, or Firm*—Wayne P. Bailey; Duke W. Yee

[57] ABSTRACT

A method and apparatus for processing interrupts for a plurality of components connected to and sharing an interrupt line in a data processing system in which interrupts are level sensitive interrupts. The components are connected to the interrupt line by interrupt connections, such as a pin. An interrupt is detected when the interrupt line is in a first state, while an interrupt is absent when the interrupt line is in a second state. Other interrupts cannot be processed while the interrupt line is in a first state. In response to detecting one or more interrupts, the connection associated with the component, for which one or more interrupts are generated, is disabled until all of the interrupts are processed. Disabling the interrupt connection allows the interrupt line to return to the first state and for additional interrupts for other components connected to the interrupt line to be detected and processed.

24 Claims, 6 Drawing Sheets

6,003,109

METHOD AND APPARATUS FOR PROCESSING INTERRUPTS IN A DATA PROCESSING SYSTEM

BACKGROUND OF THE INVENTION

1. Technical Field

The present invention relates generally to an improved data processing system and in particular to a method and apparatus for processing interrupts. Still more particularly, the present invention relates to a method and apparatus for processing hardware interrupts in a data processing system.

2. Description of the Related Art

An interrupt is a request-for-attention signal that can be passed by either hardware or software to a computer's processor. An interrupt, sometimes called a "trap", causes the processor to suspend its current operations, save the status of its work, and transfer control to a special routine, known as an interrupt handler, which causes a particular set of instructions to be carried out. Interrupts can occur for many reasons ranging from normal to highly abnormal. These reasons can include service requests from various hardware devices, errors in processing, program attempts to do the impossible, memory problems, and imminent failure of some vital component. When a processor receives interrupt requests from more than one source, a hierarchy of "permission" levels called interrupt priorities determines which of the interrupts is handled first. Many operating-system functions such as opening files, reading from files, and closing them can be accessed through interrupts. By using interrupts, a program can communicate with the operating system.

Interrupts are the processor's means of communicating with the other elements that make up a computer system. If a constant stream of interrupt requests would disrupt or complicate processing at a critical point, a program can temporarily disable interrupts, effectively gaining sole control of the processor's attention for the time needed.

With a peripheral component interconnect (PCI) bus, processors in components such as chips, boards, and other subsystems process interrupts on a level sensitive mode. In the case of a level sensitive mode, also referred to as a level trigger, an interrupt is requested when the interrupt signal is in a low level state or a high level state. On a PCI bus, multiple components can share an interrupt line. When a hardware interrupt occurs, the PCI bus/host processor is required to service this interrupt before the shared hardware interrupt can be used by another part of the data processing system. This type of hardware interrupt handling locks the interrupt service routing to just one interrupt, if the interrupt begins as a hardware interrupt.

This type of situation can reduce the speed and efficiency of the data processing system because other interrupts cannot be handled until the hardware interrupt has been processed by the particular chip or device receiving the interrupt. As additional components are added to the data processing system, the speed and efficiency can be reduced even further. Therefore, it would be advantageous to have an improved method and apparatus for processing hardware interrupts occurring in a data processing system in which multiple components share an interrupt line.

SUMMARY OF THE INVENTION

The present invention provides a method and apparatus for processing interrupts for a plurality of components connected to and sharing an interrupt line in a data processing system in which interrupts are level sensitive interrupts. The components are connected to the interrupt line by interrupt connections, such as a pin. An interrupt is detected when the interrupt line is in a first state, while an interrupt is absent when the interrupt line is in a second state. Other interrupts cannot be processed while the interrupt line is in a first state. In response to detecting one or more interrupts, the connection associated with the component, for which one or more interrupts are generated, is disabled until all of the interrupts are processed. Disabling the interrupt connection allows the interrupt line to return to the first state and for additional interrupts for other components connected to the interrupt line to be detected and processed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
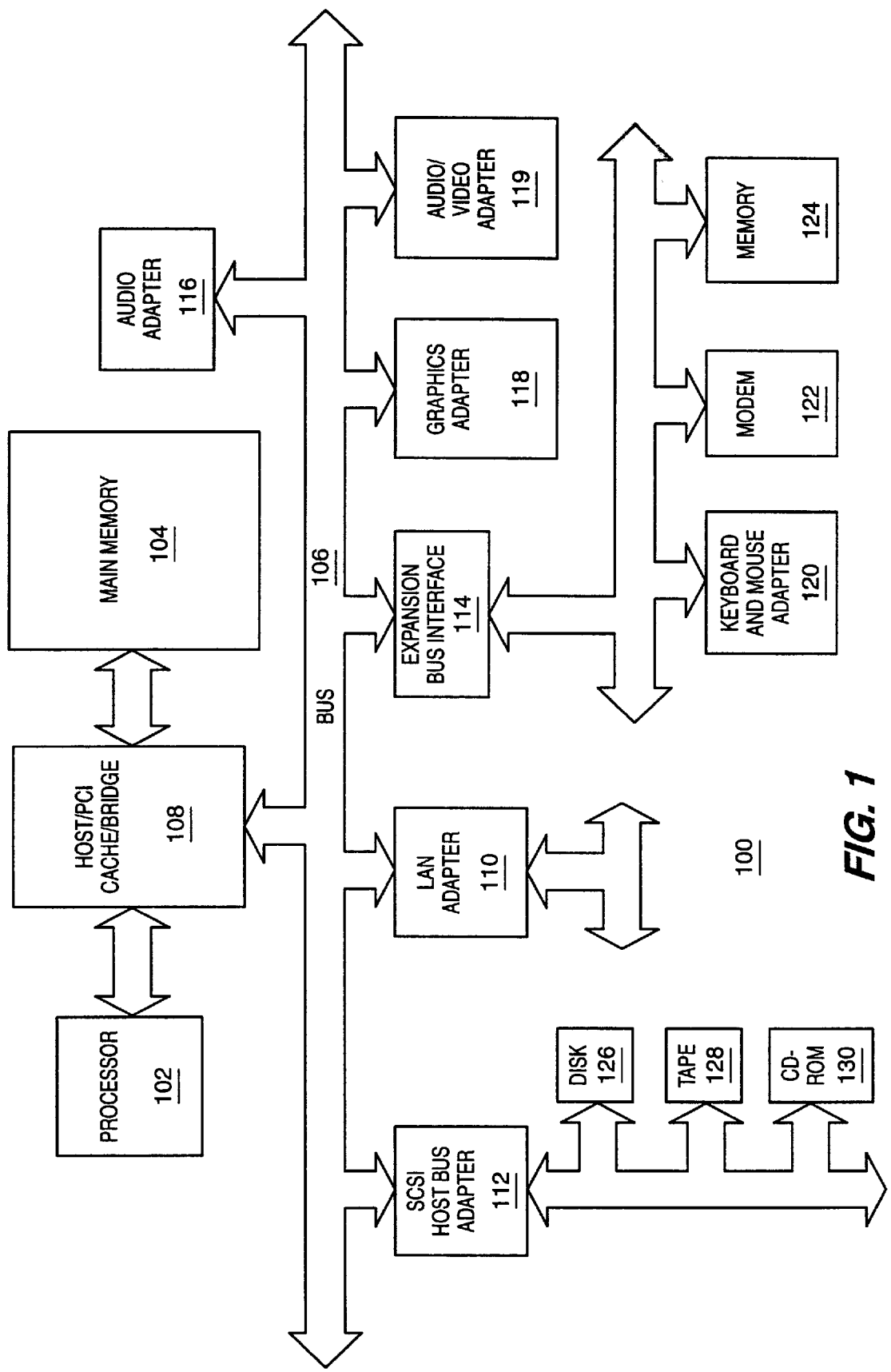
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
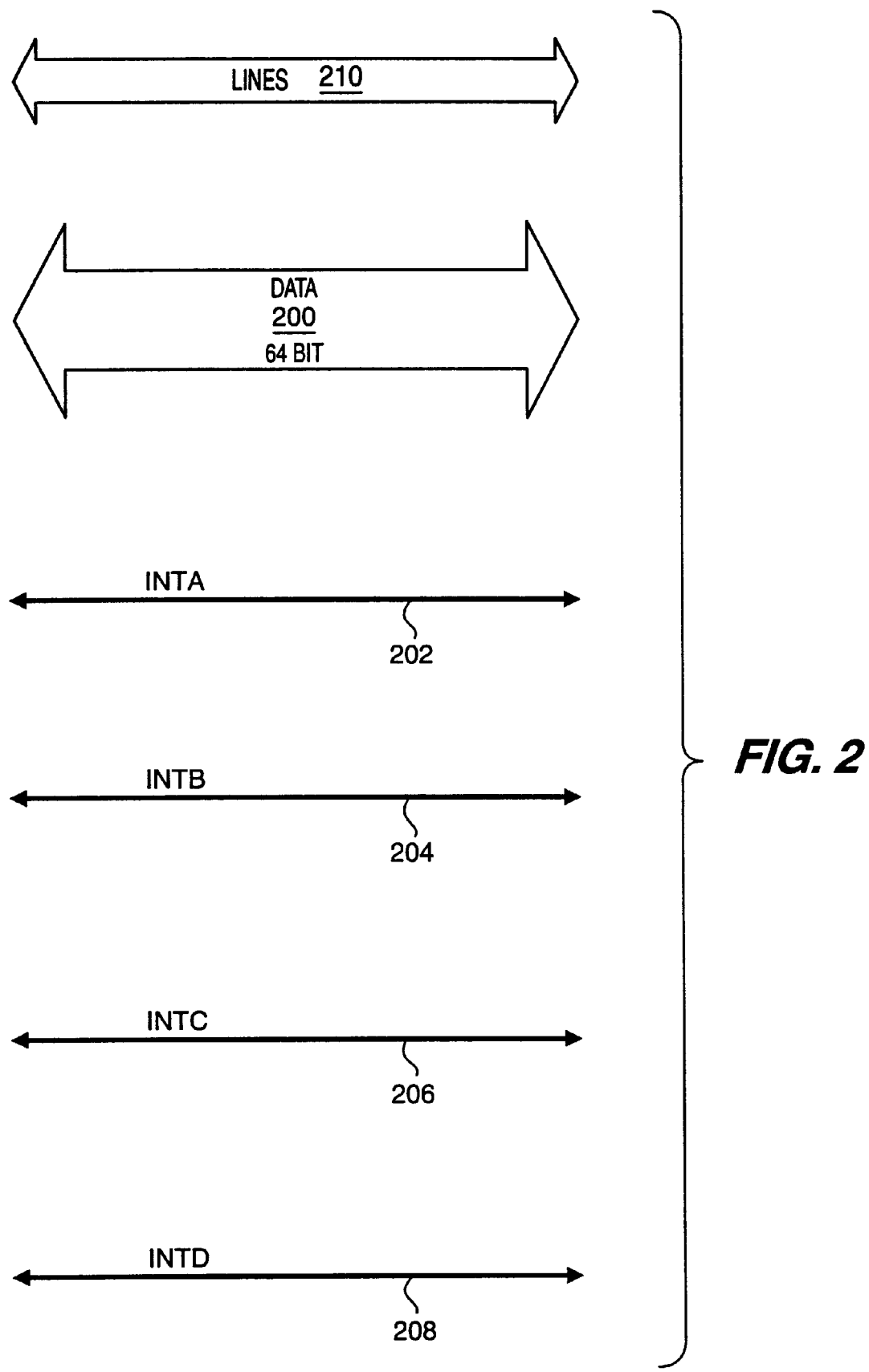
FIG. 2 is a diagram of PCI local bus through a preferred embodiment of the present invention may be implemented.

With reference now to FIG. 2, a diagram of PCI local bus 106 from FIG. 1 is depicted through which a preferred embodiment of the present invention may be implemented. In the depicted example, PCI local bus 106 contains numerous hardware lines used for data transfer among components of data processing system 100. These hardware lines include data lines 200, which provide for 64 bit data transfers in the depicted example. In addition, PCI local bus 106 also includes interrupt line (INTA) 202, interrupt line (INTB) 204, interrupt line (INTC) 206, and interrupt line (INTD) 208. These interrupt lines, in the depicted example, are shared interrupt lines in which more than one component may use the same interrupt line to identify and process interrupts.

Additionally, PCI local bus 106 also includes other signal lines 210, which are employed in addition to the data lines and the interrupt lines to exchange information within data processing system 100. For example, signal lines 210 may include a clock line to distribute a clock signal to a component within data processing system 100. Further, signal lines 210 may include, for example, physical address lines, address strobe lines, and power and control lines. These other lines are not shown in order to avoid obscuring the description of the present invention. Although the depicted example illustrates a 64 bit data line and 4 interrupt lines, other sizes for the data line and other numbers of interrupt lines may be used depending on the particular data processing system.

Figure 3:
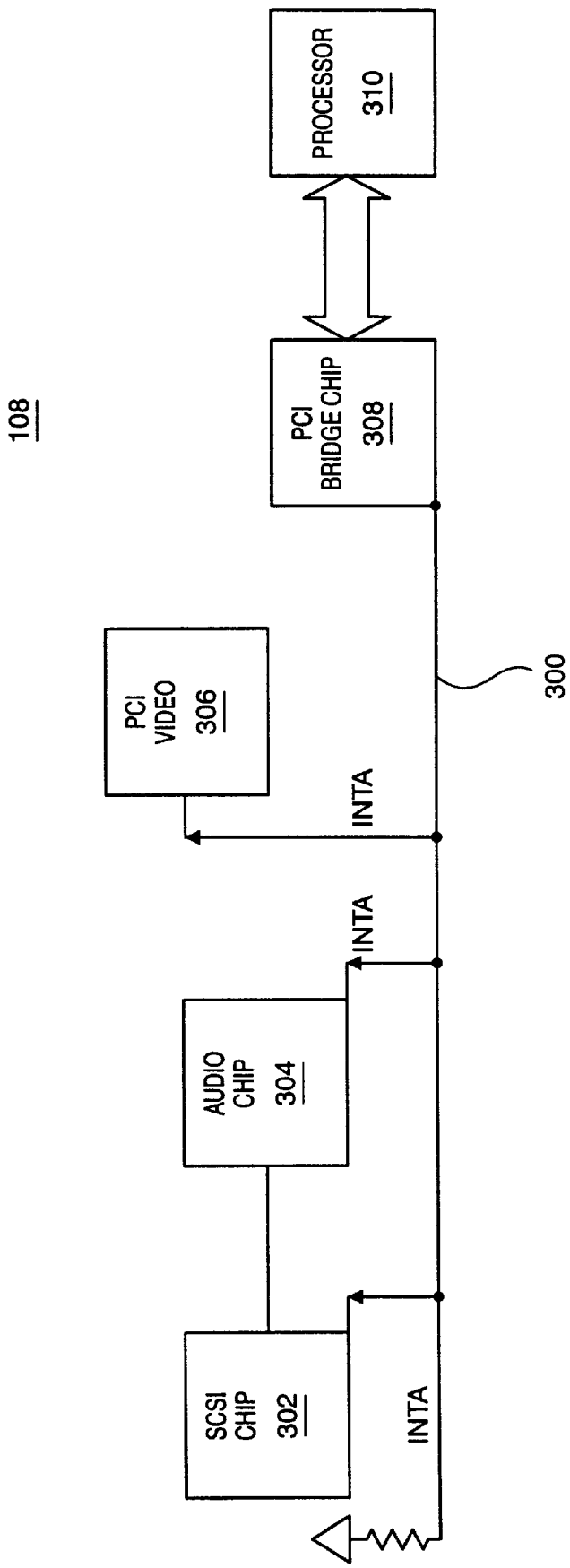
FIG. 3 is a block diagram of components connected to an interrupt line from data processing system in accordance with a preferred embodiment of the present invention.

Turning now to FIG. 3, the block diagram of components connected to an interrupt line from data processing system 100 in FIG. 1 is depicted in accordance with a preferred embodiment of the present invention. Interrupt line 300 is designated as INTA in FIG. 3. In the depicted example, a number of components are connected to interrupt line 300. In particular, small computer system interface (SCSI) chip 302, audio chip 304, and PCI via chip 306 all have connections to interrupt line 300. Additionally, PCI bridge chip 308 is connected to interrupt line 300. PCI bridge chip 308 is a chip found in a PCI bridge device, such as PCI bridge 108 in FIG. 1. PCI bridge chip 308 sends interrupts to the various components in response to a generation of an interrupt from processor 310.

The components are connected to interrupt line 300 in a shared or wired OR configuration. The components are connected to interrupt line 300 through a interrupt connection, such as a pin. Each of the chips typically pull the signal level in interrupt line 300 to a first state (a low state) when an interrupt occurs with the signal level being in a second state (a high state) when no interrupt is present. The first state, however, prevents other chips sharing interrupt line 300 from signaling and/or processing interrupts. The interrupt line defaults to the second state unless pulled to the first state to indicate a presence of an interrupt. When the line is no longer pulled to the first state by a chip, the signal level returns to the second state. Although in the depicted example, a low state indicates an interrupt, depending on the data processing system, a different state such as a high state may be employed to indicate an interrupt.

In the depicted example, however, the components are modified such that the pin associated with interrupt line 300 may be disabled such that the state of the interrupt line may return to the high state to allow signaling and/or processing of interrupts by other components sharing interrupt line 300. In the depicted example, SCSI chip 302 may be implemented using a chip from the Symbios Logic 53C8xx family of chips available from Symbios Logic. This family of chips is presently designed with a register that allows the hardware interrupt pin to be disabled without disabling interrupt functions of the chip. In accordance with a preferred embodiment of the present invention, the device driver that handles the interrupt received by the chip includes instructions to disable the hardware interrupt pin during normal operations such that multiple hardware initiated interrupts can be serviced by a software ISR while the hardware interrupt pin connected to the PCI bus has been turned off to service the interrupts and turned back on when the interrupts have been serviced.

In this manner, other components, such as video chip 304 or PCI video chip 306, may process interrupts, while SCSI chip 302 is processing one or more hardware interrupts. Additionally, video chip 304 and PCI video chip 306 may be designed such that the hardware interrupt pin may be disabled in response to instructions from a device driver associated therewith.

Figure 4:
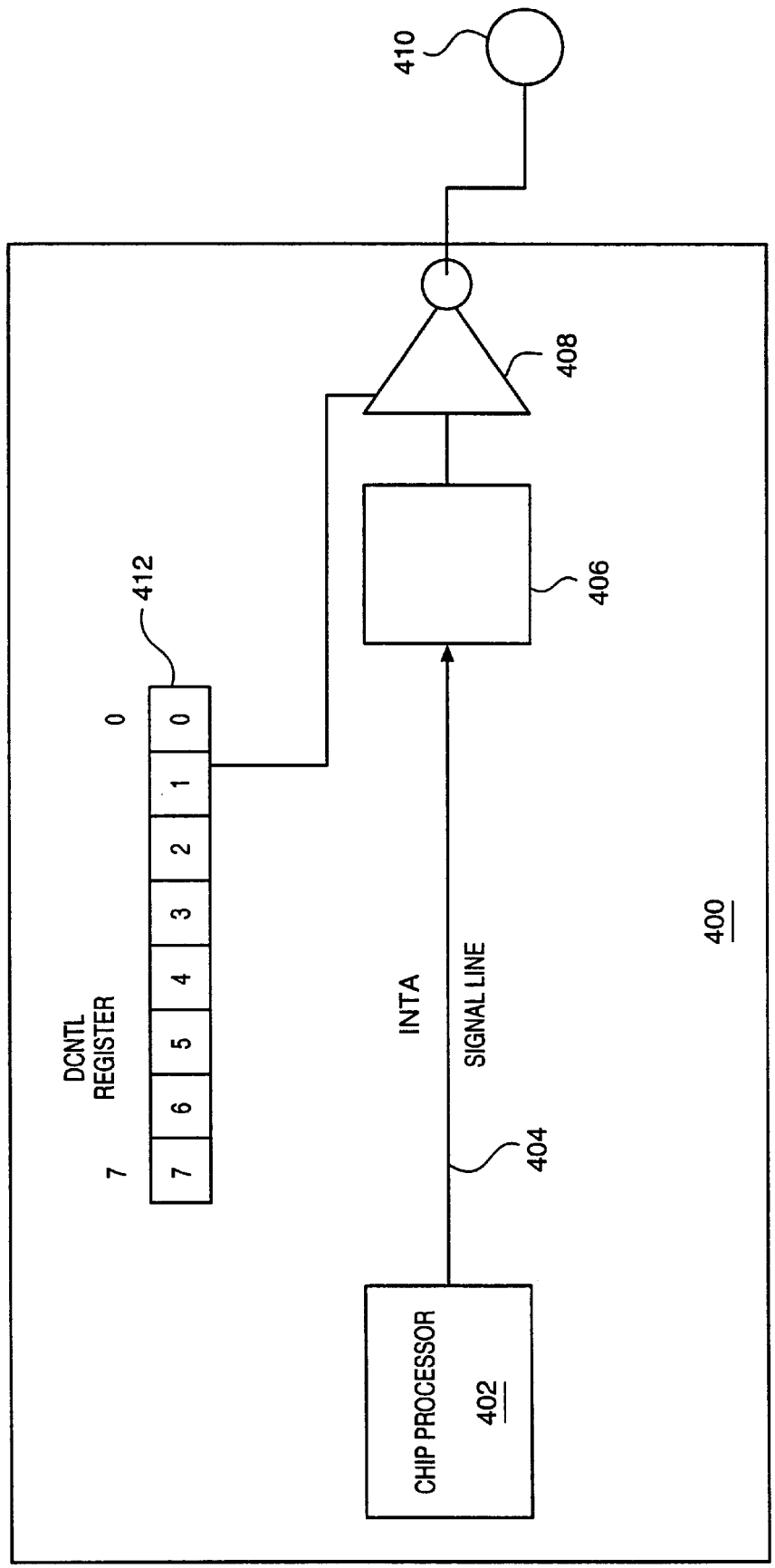
FIG. 4 is a block diagram of a component in accordance with a preferred embodiment of the present invention.

In FIG. 4, a block diagram of a component is depicted in accordance with a preferred embodiment of the present invention. Chip 400 is an example of a component in which the present invention may be implemented. Chip 400 includes a chip processor 402 having a interrupt signal line 404 connected to a pad 406. In the depicted example, interrupt signal line is a INTA signal line. Pad 406 is connected to inverter 408, which has a connection to external pin 410, which is the interrupt pin in the depicted example. Additionally, chip 400 also includes a DMA control (DCNTL) register 412. Register 412 is an 8 bit register in which bit number 1 is used to enable and disable the interrupt function. Setting this bit disables the INTA pin, external pin 410. Clearing bit number 1 enables normal operation. Chip 400 also includes other circuitry, not shown to avoid obscuring the present invention.

Figure 5:
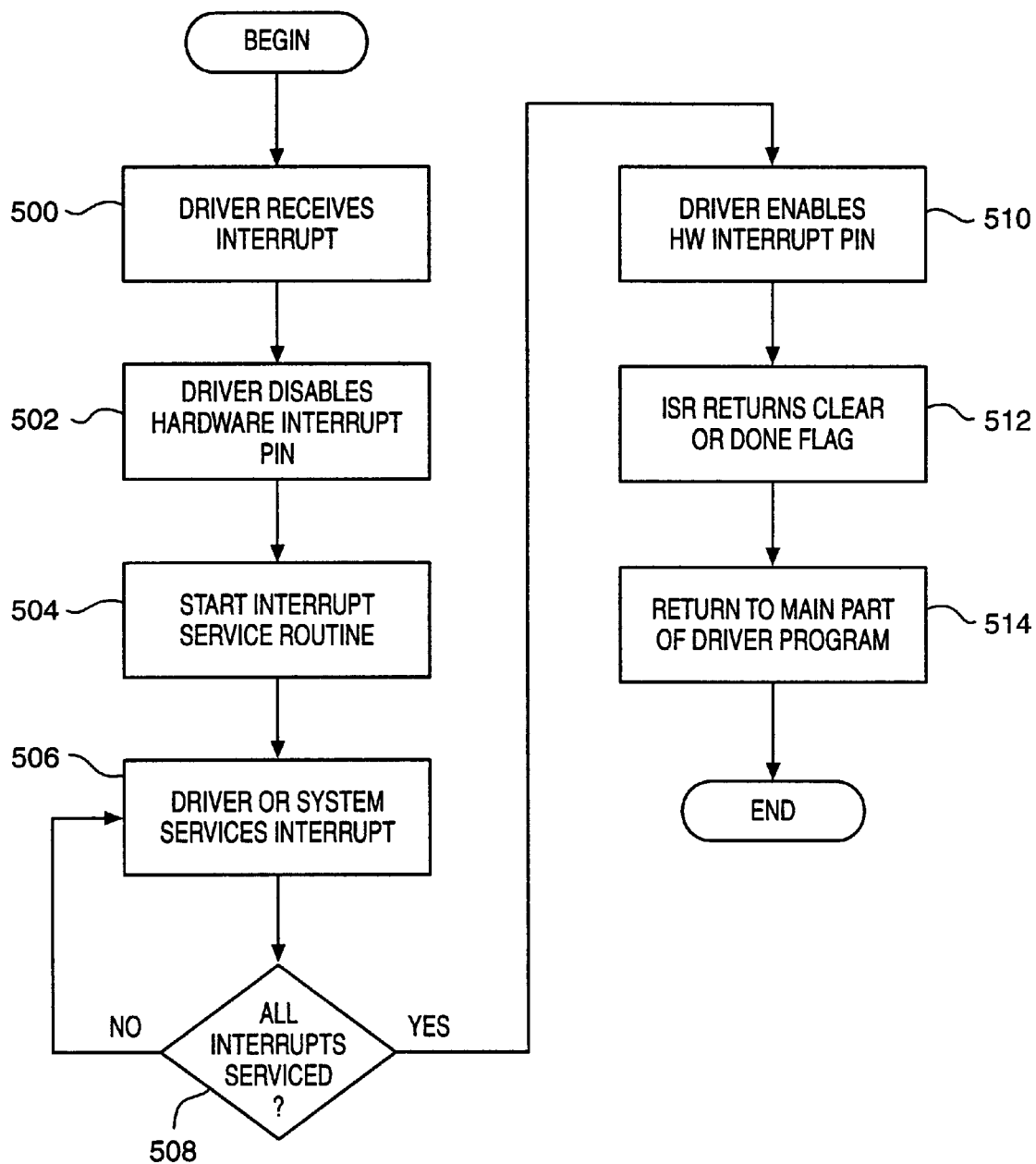
FIG. 5 is a flowchart of a process for processing interrupts in accordance with a preferred embodiment of the present invention.

Turning now to FIG. 5, a flowchart of a process for processing interrupts is depicted in accordance with a preferred embodiment of the present invention. This process is executed by a device driver for a chip such as SCSI 302 in FIG. 2. The process begins with the device driver receiving an interrupt (step 500). Next, the device driver disables the hardware interrupt pin (step 502). The device driver starts an interrupt service routine in response to receiving the interrupt (step 504). This is accomplished by setting the bit in the register for the chip. Although in the depicted example, the chip has a register that may be used to enable and disable a connection to the interrupt line, other mechanisms may be employed to allow the device driver or interrupt service routine to enable and disable a connection to the interrupt line. Next, the device driver or operating system services the interrupt (step 506). In the depicted example, the operating system may be a multiple processor or multi-tasking operating system such as UNIXWARE, AIX, or NT Windows. A determination is then made as to whether all of the interrupts for the chip have been serviced (step 508). In the depicted example, the determination as to whether all of the interrupts have been serviced may be made by checking the status of a register within the chip. Such a register is set to one state when interrupts are still present for servicing and set to a second state when the interrupts have been serviced. If all of the interrupts have not been serviced, the process then returns to step 506 for servicing or processing of the interrupt. Upon determining that all of these interrupts have been serviced, the process then enables the hardware interrupt pin (step 510). This is accomplished by clearing the bit in the register for the chip. Thereafter, the ISR returns a clear or done flag to the device driver (step 512). The process then returns to the main part of the device driver of the program (step 514) with the process terminating thereafter.

Figure 6:
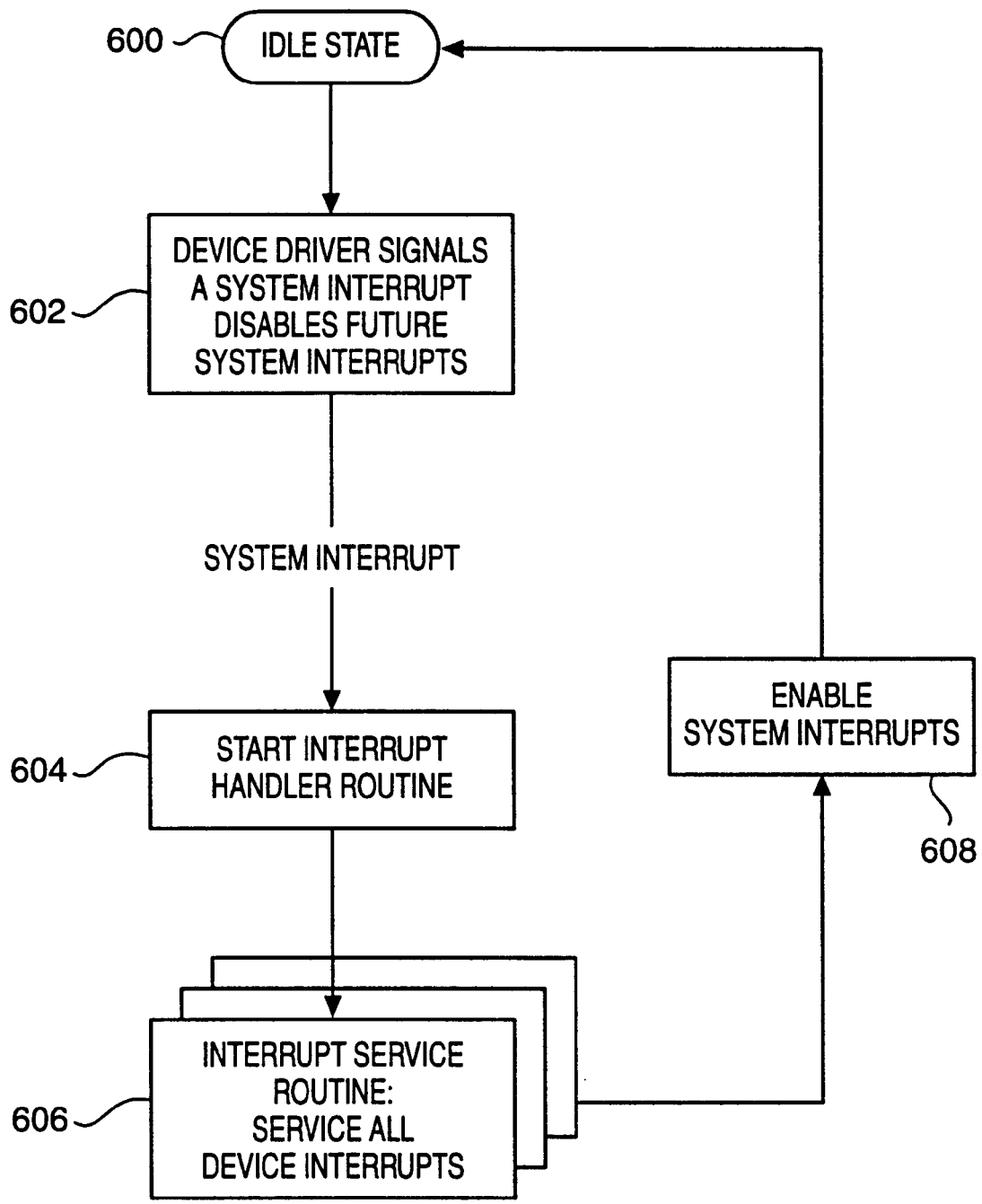
FIG. 6 is a block diagram showing the relationship between a device driver and an interrupt service routine in a data processing system in accordance with a preferred embodiment of the present invention.

With reference now to FIG. 6, a diagram showing the relationship between a device driver and an interrupt service routine in a data processing system is depicted in accordance with a preferred embodiment of the present invention. The diagram begins with the data processing system in an idle state in which the device, also referred to as a component, is executing normally (state 600). In response to an interrupt being generated by the device, the device driver signals a system interrupt is needed and disables future system interrupts from this device (i.e., disables the interrupt pin) (state 602). The device component driver is a piece of code that runs on a component. One of the functions of the device component driver is to signal the data processing system when an interrupt occurs. The data processing system contains an detection routine, which starts an interrupt handler routine (state 604). Thereafter, the interrupt handler routine starts the device's interrupt service routine (state 606). With this invention, the interrupt service routine processes all device interrupts while eliminating any system interrupts before enabling the normal system interrupt setting (i.e., enables the interrupt pin, allowing subsequent device interrupts to be processed as above in the case in which multiple interrupts are present (state 608). Data processing system remains in state 608, activating other service routines, as long as system interrupts are available for processing. When all system interrupts have been processed, the data processing system returns to the idle state in state 600.

Thus, the present invention provides an improved method and apparatus for processing hardware interrupts for devices sharing an interrupt line. The present invention provides this advantage by disabling a connection for a chip to the interrupt line in response to detecting and processing an interrupt. In this manner, the state of the interrupt line can return to a non-interrupt level in which other interrupts may be processed rather than having the interrupt line remain at a interrupt level, preventing processing of other interrupts.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. For example, the present invention may be applied to other bus architectures other than a PCI bus. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system processing for hardware interrupts generated by a plurality of components, wherein each component has a connection to an interrupt line, wherein the interrupt line is in a first state in response to an absence of an interrupt and is in a second state in response to a presence on an interrupt in which a component indicates an interrupt by pulling the interrupt line to said second state, and wherein the interrupt line defaults to the first state absent a pulling of the interrupt line to the second state, the method comprising:

detecting an occurrence of the interrupt in a component within the plurality of components; and responsive to detecting an occurrence of the interrupt, disabling the connection for the component until the interrupt is processed, wherein the interrupt line returns to the first state such that other components within the plurality of components are able to signal and process interrupts.

2. The method of claim 1, wherein the first state is a high state and the second state is a low state.

3. The method of claim 1, wherein the component is a chip including a processor and the connection is an interrupt pin and wherein the processor pulls the interrupt line to the second state until the interrupt is processed.

4. The method of claim 1, wherein the component is a SCSI chip.

5. The method of claim 1, wherein the data processing system has a level sensitive interrupt system for processing hardware interrupts.

6. A data processing system comprising:

a bus including an interrupt line, wherein a signal on the interrupt line is in a first state to indicate that an interrupt is present and wherein the signal is in a second state to indicate that an interrupt is absent, wherein the signal defaults to the second state unless pulled to the first state;

a plurality of components, each component within the plurality of components having an interrupt connection coupled to the interrupt line in a wired or configuration, wherein an interrupt generated by a component is indicated by the component pulling the signal on the interrupt line to the first state using the interrupt connection;

detection means for detecting an occurrence of the interrupt by detecting the first state in the signal on the interrupt line;

disabling means for disabling the interrupt connection associated with the component that generated the interrupt until the interrupt has been processed, wherein the signal on the interrupt line shifts to the second state such that another device within the plurality of devices is able to indicate an another interrupt; and processing means for processing the interrupt.

7. The data processing system of claim 6, wherein the first state is a low state.

8. The data processing system of claim 6, wherein the first state is a high state.

9. The data processing system of claim 6, wherein the component is a SCSI chip.

10. The data processing system of claim 6, wherein the plurality of components are a plurality of chips in which each chip pulls the signal to the first state until the interrupt is processed.

11. The data processing system of claim 6, wherein the interrupt connection is an interrupt pin.

12. The data processing system of claim 6, wherein the component includes:

an interface circuit having an input and an output, wherein the output is connected to the interrupt pin and wherein the interface circuit pulls the signal to the first state in response to an indication of the interrupt; and a processor having a connection to the input, wherein the processor generates the indication of an interrupt;

wherein the disabling means disables the interface such that the signal on interrupt line is unaffected by the component.

13. The data processing system of claim 12, wherein the interface circuit is an inverter.

14. The data processing system of claim 6, wherein the bus is a PCI bus.

15. A chip comprising:

a processor;

an interrupt connection configured to be coupled to an interrupt line, wherein an interrupt generated by a processor is indicated by the processor by pulling a signal on the interrupt line to a first state using the interrupt connection to indicate that an interrupt has occurred, wherein the processor continues to pull the signal to the first state until the interrupt is processed;

disabling means for disabling the interrupt connection until the interrupt has been processed, wherein the signal on the interrupt line shifts to a second state such that another chip coupled to the interrupt line is able to indicate another interrupt on the interrupt line.

16. The data processing system of claim 15, wherein the first state is a low state.

17. The data processing system of claim 15, wherein the first state is a high state.

18. The data processing system of claim 15, wherein the component is a SCSI chip.

19. The data processing system of claim 15, wherein the interrupt connection is an interrupt pin.

20. A data processing system comprising:

a bus including an interrupt line, wherein a signal on the interrupt line is in a first state when an interrupt is absent and the signal on the interrupt line is in a second state when an interrupt is present;

a plurality of components each chip within the plurality of chips having an interrupt connection coupled to the interrupt line, wherein an interrupt generated by a component is indicated by the component pulling a signal on the interrupt line to the first state using the interrupt connection;

wherein the data processing system has a plurality of modes of operations including:

a first mode of operation, responsive to detecting the signal being in the second state, in which the data processing system disables the interrupt connection associated with the component generating the interrupt; and a second mode of operation, responsive to processing the interrupt, in which the data processing system enables the interrupt connection.

21. A chip comprising:

a processor; and an interrupt connection configured to be coupled to an interrupt line, wherein the interrupt line has a first state and a second state in which the interrupt line always shifts to the second state unless the interrupt line is being pulled to the first state, wherein an interrupt generated by a processor is indicated by the processor by pulling the interrupt line to the first state using the interrupt connection to indicate that an interrupt has occurred, wherein the processor continues to pull the signal to the first state until the interrupt is processed;

wherein the chip has a plurality of modes of operation including:

a first mode of operation in which the chip monitors for an occurrence of an interrupt;

a second mode of operation, responsive to detecting the occurrence of the interrupt, in which the interrupt connection is disabled allowing the interrupt line to shift back to the second state such that another chip coupled to the interrupt line is able to indicate another interrupt on the interrupt line;

a third mode of operation, responsive to disabling the interrupt connection, for determining whether the interrupt has been serviced;

a fourth mode of operation, responsive to a determination that the interrupt has been processed, in which a determination is made as to whether any additional interrupts are present in the chip; and a fifth mode of operation, responsive to a determination that no interrupts are present in the chip, in which the interrupt connection is enabled, such that interrupts may be indicated by the processor using the interrupt line.

22. The chip of claim 21, wherein the interrupt connection is an interrupt pin.

23. The chip of claim 22, wherein the chip includes a register that is used to enable and disable the interrupt pin.

24. The chip of claim 21, wherein the interrupt is processed using a device component driver on the chip.

* * * * *